United States Patent Office 3,775,341
Patented Nov. 27, 1973

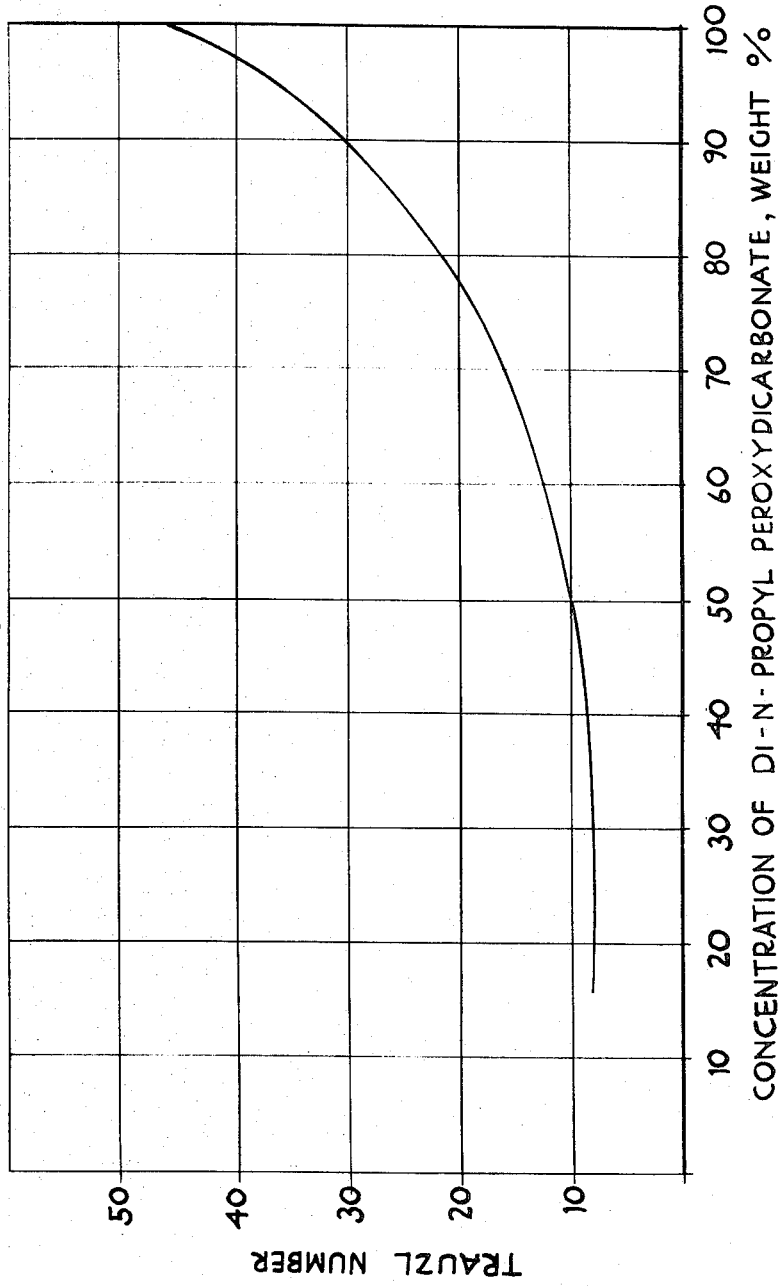

3,775,341
LIQUID DIALKYL PEROXYDICARBONATE COMPOSITION
James A. Barter, Akron, Ohio, assignor to PPG Industries, Inc., Pittsburgh, Pa.
Filed Aug. 2, 1971, Ser. No. 168,006
Int. Cl. C08f 1/60
U.S. Cl. 252—426          12 Claims

ABSTRACT OF THE DISCLOSURE

Compositions of liquid dialkyl peroxydicarbonate, e.g., di-n-propyl peroxycarbonate, and alkylated cyclohexane diluent, e.g., methylcyclohexane, are described. The compositions remain miscible at low temperatures, e.g., −35° C., are suitable for use as polymerization initiators for the production of polymers used in food wrapping, and are substantially less hazardous than the neat (100%) dialkyl peroxydicarbonate.

---

Liquid lower alkyl peroxydicarbonates, such as di-n-propyl peroxydicarbonate and diisobutyl peroxydicarbonate, have been described in the art. These materials may be used as initiators for the polymerization of vinyl esters and ethylene. Though possessing considerable usefulness for this purpose, some of the liquid lower alkyl peroxydicarbonates, such as di-n-propyl peroxydicarbonate, suffer from certain restrictions inherent in their solubility and their specific thermal stability, i.e., they are too insoluble in mineral spirits and similar hydrocarbon solvents for safe handling in solution at low temperatures, and at higher temperatures at which they are soluble, serious decomposition is liable to occur. The substantial commercial use of some liquid lower alkyl peroxydicarbonates has, therefore, awaited the discovery of a suitable diluent or solvent.

As used herein, the term liquid lower alkyl peroxydicarbonates is intended to mean and include those dialkyl peroxydicarbonate esters, or mixtures thereof, which are normally liquid at temperatures above about −40° C., i.e., those whose melting points are below about −40° C. Preferred are the liquid $C_2$-$C_4$ dialkyl peroxydicarbonate esters. Examples include: di-n-propyl peroxydicarbonate (M.P. −62° C.), diethyl peroxydicarbonate, di-n-butyl peroxydicarbonate, diisobutyl peroxydicarbonate and di-secondary butyl peroxydicarbonate (M.P. <−80° C.). Of particular utility of the above-named peroxydicarbonate esters are di-n-propyl peroxydicarbonate and diisobutyl peroxydicarbonate. For the sake of brevity, the following discussion will be partially restricted to n-propyl peroxydicarbonate.

Di-n-propyl peroxydicarbonate, also called NPP and n-propyl percarbonate, has been known to the art for some time. It has the general formula,

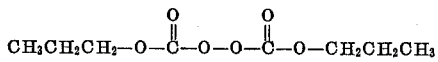

and is described in U.S. Pat. No. 2,370,588 and J. Am. Chem. Soc. 72, 1254 (1950). It is an efficient initiator for the polymerization of unsaturated monomers containing ethylenic unsaturation, e.g., vinyl esters such as vinyl acetate, and vinyl chloride, and ethylene, and such use is described in U.S. Pat. Nos. 2,464,062 and 2,820,779. In comparison with diisopropyl peroxydicarbonate, which is shipped and handled as a frozen solid (M.P. 8–10° C.), di-n-propyl peroxydicarbonate can be shipped and handled as a liquid.

Liquid peroxydicarbonates, such as di-n-propyl peroxydicarbonate, are subject to slow exothermic decomposition at normal room temperatures. Adequate refrigeration is, therefore, required at all times to maintain them in a relatively safe condition during storage and handling. Specifically, it is recommended that NPP be stored below −18° C. (0° F.). Moreover, unless stored under conditions which facilitate the removal of the heat of decomposition, a gradual increase in temperature may occur within the body of the ester. At the resulting higher temperature, the rate of decomposition is increased, thereby resulting in a progressively more rapid elevation in temperature within the body of the ester, i.e., an autoaccelerating effect, until the entire mass decomposes with explosive violence.

At temperatures above 5° C., e.g., from 5° C. to 30° C., NPP is miscible in all proportions with most aliphatic and aromatic hydrocarbons, esters, ketones and chlorinated hydrocarbons. However, at storage temperatures, e.g., −18° C. to −35° C., NPP and such diluents can separate into distinct phases. This condition is known as phase separation and results in the concentrating of the NPP, which may result in a hazardous condition, e.g., in the case of a spill or a temporary loss of refrigeration. Therefore, a suitable diluent or solvent for NPP must remain miscible with the ester at storage temperatures of as low as −35° C.

A significant amount of polyvinyl chloride and polyethylene (for which NPP can be used as the polymerization initiator) is used in the wrapping of food. The diluent employed for NPP, therefore, must not leave appreciable residues on the polymer film which would cause disapproval of such film and consequently of such use for NPP by the United States Food and Drug Administration. When aromatic hydrocarbons, such as toluene and benzene, are used as the sole diluent for the peroxydicarbonate initiator, there exists the possibility of contamination of the polymer film with residues from such diluents. Although the amount of initiator, and, therefore, the amount of diluent, used to polymerize ethylenically unsaturated monomers is small relative to the total polymerization system, the amount of aromatic residues on the polymer film permitted by regulatory agencies, such as the FDA, is also small.

Further, the diluent used must not add to the hazards of handling liquid alkyl peroxydicarbonates, such as by inducing its decomposition or by being too volatile at ambient temperatures, i.e., in case of a spill, the diluent will quickly volatilize and leave behind a concentrated mass of NPP; liquid aliphatic hydrocarbons, such as n-hexane and n-pentane, are examples of diluents that will volatilize readily at atmospheric pressure and ambient temperatures. In addition, the liquid peroxydicarbonate diluent must be compatible with the deodorized mineral spirits and kerosenes used by polymer manufacturers, such as polyethylene manufacturers, for feeding initiator solutions to the polymerization vessel. Finally, the liquid peroxydicarbonate diluent must not cause any detrimental effect during the polymerization reaction, such as by inducing chain transfer during the polymerization reaction.

Diluents that have been suggested for use with diisopropyl peroxydicarbonate (IPP) include: toluene, xylene, benzene, cyclohexane, naphthalene, trichloroethylene, tetrachloroethylene (perchloroethylene), diphenyl ether and n-hexane. See, for example, U.S. Pat. No. 3,022,282. All of these, for one or more of the above reasons, limit the current usage of n-propyl percarbonate (NPP).

It has now been discovered that alkylated cyclohexanes, i.e., cyclohexane having side chain(s) of lower alkyl groups, can be used as a diluent (solvent) for liquid lower alkyl peroxydicarbonates, notably n-propyl percarbonate. Solutions of n-propyl percarbonate and alkylated cyclohexanes, particularly methyl cyclohexane, are miscible in all proportions at the temperatures of storage, handling and use, e.g., −35° C. to 200° C., and remain intact, i.e., do not phase separate, at storage temperatures of from −18° C. to −35° C. Moreover, such solutions have a significantly lower Trauzl number (a value which measures the hazardous nature of the solution) than neat n-propyl percarbonate. For example, a 95% NPP solution in methylcyclohexane has a Trauzl number of about 36 (the lower the value, the better) compared to 45 for the neat NPP. Further, the alkylated cyclohexanes described herein satisfy the other previously mentioned requirements for a percarbonate diluent; namely, residues thereof (if any) on polymeric resins are not objectionable so that the polymer can be used for wrapping food products; they do not induce or cause decomposition of the liquid percarbonate; they do not cause a deleterious effect, such as chain transfer, during the polymerization reaction; and they are compatible with the deodorized mineral spirits and kerosenes used by polymer manufacturers as diluents for feeding initiator solutions to the polymerization reactors.

Typically, the compositions of the present invention comprise from 25 to 95 weight percent liquid lower alkyl peroxydicarbonate and from 5 to 75 weight percent of the alkylated cyclohexane. It has also been discovered that a co-diluent can be used with the alkylated cyclohexane; but, that at least 50 weight percent of the total diluent used should be the alkylated cyclohexane. Among the co-diluents that are employable there can be mentioned aliphatic and aromatic hydrocarbons, esters, ethers, ketones and chlorinated hydrocarbons.

BRIEF DESCRIPTION OF THE DRAWING

The attached figure is a graph of Modified Trauzl Block Test Number versus concentration of di-n-propyl peroxydicarbonate in methylcyclohexane at 0° C.

DETAILED DESCRIPTION

Dialkyl peroxydicarbonate esters, including di-n-propyl peroxydicarbonate, can be prepared by treating the appropriate alkyl chloroformate, i.e., n-propyl chloroformate, in an aqueous solution at about 0° C. to 20° C. with a mixture of aqueous sodium hydroxide and hydrogen peroxide in acordance with the following balanced equation,

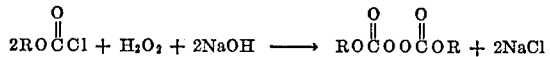

For n-propyl percarbonate, R in the above equation would be the n-propyl radical. In place of hydrogen peroxide and sodium hydroxide, sodium peroxide can be used. See, for example, U.S. Pat. No. 2,464,062 and Canadian Pat. No. 775,132. Typically, the reaction is conducted by adding the peroxide or peroxide solution to the alkyl chloroformate while agitating the reaction mass vigorously and simultaneously cooling the reaction mass.

The alkylated cyclohexanes that can be used as a diluent in the present novel compositions can be described as lower alkyl substituted cyclohexanes. By lower alkyl substituted cyclohexanes is meant compounds produced by the substitution of one, two or three hydrogen atoms of cyclohexane with $C_1$–$C_4$ aliphatic hydrocarbon radicals, e.g., methyl, ethyl, propyl, isopropyl, butyl, isobutyl, secondary butyl, and tertiary butyl. The aliphatic hydrocarbon radicals attached to the cyclohexane as a side chain can be the same or different. Further, the side chains can be positioned around the six available positions of the cyclohexane ring in any manner. Preferably, the alkyl radicals will be in the 1,2-, 1,3-, 1,4-, and 1,3,5 positions.

Exemplary of typical alkylated cyclohexanes include: methylcyclohexane, the dimethylcyclohexanes, i.e., 1,2-dimethylcyclohexane, 1,3-dimethylcyclohexane, 1,4-dimethylcyclohexane, the cis and trans form of 1,2-dimethylcyclohexane, and mixtures of 1,2-, 1,3- and 1,4-dimethylcyclohexane, n - propylcyclohexane, isopropylcyclohexane, 1,3,5-trimethylcyclohexane, 4-isopropyl-1-methylcyclohexane (p-menthane), tertiarybutyl cyclohexane, tertiarybutyl-4-methylcyclohexane and mixtures thereof. Methylcyclohexane is preferred because of its availability and cost.

Alkylated cyclohexanes, notably methylcyclohexane, are commercially available as by-products from the petroleum industry. Alkylated cyclohexanes which are not readily available from industrial sources can be synthesized by, for example, the Friedel-Crafts alkylation of benzene (which is commercially available), followed by the catalytic hydrogenation of the resulting alkyl benzene to the desired alkylcyclohexane. These reactions are well known in the chemical arts and are described in most organic chemistry texts. Thus, for example, hydrogenation of toluene and m-xylene yields methylcyclohexane and 1,3-dimethylcyclohexane, respectively.

The alkylated cyclohexanes described above and, for example, n-propyl percarbonate, are miscible in all proportions at the ordinary temperatures of from 5° C. to 30° C. and do not phase separate at temperatures of, for example, −35° C. Of particular utility are compositions comprising from 25 to 95 weight percent, e.g., 50–85 percent, di-n-propyl peroxydicarbonate and from 5 to 75 weight percent of the miscible diluent.

It has also been found that a portion of the alkylated cyclohexane diluent can be replaced with a minor amount of miscible co-diluent. The co-diluent must satisfy the same requirements as the principal alkylated cyclohexane diluent, i.e., it must be miscible with the n-propyl percarbonate, it must remain miscible with the percarbonate at temperatures of storage, handling and use, i.e., not be subject to phase separation, it must not enhance or cause the decomposition of the n-propyl percarbonate, it must be compatible with the deodorized mineral spirits and kerosenes used by the polymer manufacturers as diluents, and it must not leave residues on the polymer resin that would be objectionable to the United States Food and Drug Administration (FDA). Since the co-diluent is used as a minor (less than 50 weight percent) ingredient of the total diluent, i.e., the solvent system, and the total amount of diluent used is small relative to the polymerization system, the amount of co-diluent residue on the polymer film tends to be within tolerable limits.

The total diluent system used can, therefore, comprise from 50 to 100 weight percent alkylated cyclohexane and from 0 to 50 weight percent of a co-diluent. Thus, at least 50 weight percent of the total diluent is alkylated cyclohexane and, preferably, from 60 to 90 weight percent of the diluent is alkylated cyclohexane. The particular co-diluent or combinations of co-diluents used is not critical, provided that they satisfy the aforementioned recited requirements.

Examples of co-diluents that can be used in conjunction with the alkylated cyclohexanes described above include: the liquid aliphatic hydrocarbons, such as n-hexane, n-heptane, iso-octane, kerosene, odorless mineral spirits and higher paraffinic liquid distillates that are commercially available from the petroleum industry; aromatic hydrocarbons, such as benzene, toluene, xylene, and Tetralin (tetrahydronaphthalene); tertiarybutyl benzene, secondary butyl benzene, isobutyl benzene, n-butyl benzene, secondary amyl benzene and mixed amyl benzenes; unsubstituted cyclic hydrocarbons, such as cyclohexane and decalin (decahydronaphthalene) alkylated cyclopentanes such as methyl, ethyl and dimethyl cyclopentane; esters such as ethyl acetate, isobutyl acetate, propyl propionate, and ethyl butyrate; ketones such as methyl heptyl ketone, methyl ethyl ketone, methyl isobutyl ketone; chlorinated hydrocarbons such as ethylene dichloride, trichloroethylene, tetrachloroethylene, chlorobenzene, and ortho-dichlorobenzene; and mixtures of the aforementioned co-diluents.

Examples of the use of combinations of co-diluents can be illustrated by reference to the various grades of commercially available methylcyclohexane. "Commercial grade" methylcyclohexane available from the Phillips Petroleum Co. comprises about 70% methylcyclohexane, about 22% n-heptane, and about 7% toluene. The remaining one percent is composed of other unidentified hydrocarbon materials. Technical grade methylcyclohexane (Phillips Petroleum Co.) comprises about 96.5% methylcyclohexane, 0.5% n-heptane, 1.8% cis-1,2-dimethylcyclopentane, 0.4% ethylcyclopentane, and 0.8% toluene. Practical grade methylcyclohexane (Matheson Chemical Co.) comprises about 97.9% methylcyclohexane, 1.1% 1,2-dimethylcyclopentane, 0.4% n-heptane, 0.1% ethylcyclopentane and 0.5% toluene.

In addition, there can be employed as the co-diluent, or as a portion thereof, hydrocarbon solvents produced by the petroleum industry and sold under various designated trade names and numerical codes, such as Espesol (Charter Chemical Co.), Soltrol (Phillips Petroleum Co.), and Certrex (Mobil Oil Co.) These materials are blends of various hydrocarbon constituents with different boiling point ranges and consist of various combinations of paraffins, olefins, naphthanes and aromatics.

The compositions of the present invention are prepared by admixing the liquid alkyl peroxydicarbonate with the desired amount of diluent. The mixing can be performed in any suitable manner but, preferably, the peroxydicarbonate ester is added to the diluent. Care should be exercised in preparing the solution of diluent and peroxydicarbonate ester to insure that the temperature of the resulting solution does not reach temperatures at which the decomposition rate of the ester is significant, e.g., for dilute solutions (10–20 weight percent peroxydicarbonate), temperatures up to 25° C. can be tolerated.

Referring now to the attached figure, there is shown a graph of the effect of concentration on the Modified Trauzl Block Test Number for n-propyl percarbonate in methylcyclohexane (Phillips Petroleum Co. commercial grade—70% methylcyclohexane) at 0° C. This Trauzl block test is a measure of sensitivity to a No. 8 blasting cap and a measure of the damage potential. The net volume increase of the cavity in a lead block, as caused by the blasting cap and the sample decomposition, is measured and defined as the Trauzl Number. The lead block is made by drilling a one-inch diameter cavity in a two-inch diameter extruded lead rod. The walls and bottom of the lead rod are one-half inch thick. Larger Trauzl numbers indicate more hazardous materials. The Organic Peroxide Producers Safety Division hazard ratings for this test are "low" for a Trauzl number less than 15, "intermediate" for a Trauzl number of 15 to less than 35, and "maximum" for a Trauzl number of 35 to 60.

In conducting the modified Trauzl block test, a six gram sample of the material tested is weighed accurately into a simple vial. The No. 8 electric blasting cap is placed in the test sample and the prepared vial is placed in the lead block, set in a test area, and the blasting cap fired from a safe place. No samples are left in contact with the blasting cap for any length of time. The volume of the lead block is measured accurately before and after testing, using water as the reference medium. The volume is measured to the nearest half milliliter.

The attached figure shows the reduction in hazard (as measured by the Trauzl number) at 0° C. as pure NPP is diluted with the methylcyclohexane solvent. The figure shows that the Trauzl number decreases rapidly as small amounts of methylcyclohexane are added. Compare a Trauzl number of 46 for 100% (neat) n-propyl percarbonate versus 36 for 95% NPP and 25 for an 85% n-propyl percarbonate. Thus, an 85% solution of n-propyl percarbonate is measurably less hazardous than the neat n-propyl percarbonate.

As used in this description herein, percentages are weight percent unless stated otherwise.

The present process is more particularly described in the following example which is intended as illustrative only since numerous modifications and variations therein will be apparent to one skilled in the art.

EXAMPLE

The stability of n-propyl percarbonate solutions using alkylated cyclohexanes as the diluent with and without co-diluents were tested as follows. Into a glass bottle were introduced the amount of diluent and, if used, co-diluent required to prepare a 75 or 85 weight percent n-propyl percarbonate solution. Thereafter, sufficient n-propyl percarbonate was added to the solvent to prepare a 25 gram solution of the desired concentration. The sample was stored at −35° C. and the solution observed for phase separation between the n-propyl percarbonate and the solvent system. Phase separation was noted by the formation of two separate liquid layers. The date is tabulated in the table. This data shows that only in the case where the methylcyclohexane was below 50% of the solvent did phase separation occur (Runs 7 and 9). In Run 7, the effective methylcyclohexane concentration was 35% of the solvent system.

TABLE

| Run | Solvent | Added co-solvent | Wt. ratio, solvent/co-solvent | NPP, wt. percent | Phase separation at −35° C. |
|---|---|---|---|---|---|
| 1 | Methylcyclohexane [1] | | | 75 | No. |
| 2 | do.[2] | | | 75 | No. |
| 3 | do.[2] | | | 85 | No. |
| 4 | Ethylcyclohexane | | | 75 | No. |
| 5 | 1,2-dimethylcyclohexane | | | 75 | No. |
| 6 | 1,4-dimethylcyclohexane | | | 75 | No. |
| 7 | Soltrol 130 [3] | Methylcyclohexane [2] | 1/1 | 75 | Yes. |
| 8 | Methylcyclohexane [2] | Methyl heptyl ketone | 4/1 | 75 | No. |
| 9 | Soltrol 130 [3] | | | 75 | Yes. |

[1] Practical grade=about 98% methylcyclohexane.
[2] Commercial grade=about 70% methylcyclohexane.
[3] An odorless mineral spirit sold by Phillips Petroleum Company that has a typical boiling range of 349–406° F., a typical flash point (estimated) of 133° F., a typical aniline point of 185° F., and a typical Kauri butanol value of 26.1.

While there are above described a number of specific embodiments of the present invention, it is obviously possible to produce other embodiments and various equivalent modifications thereof without departing from the spirit of the invention.

Havin gset forth the general nature and specific embodiments of the present invention, the scope thereof is now particularly pointed out in the appended claims.

I claim:

1. A composition consisting essentially of from about 25 to 95 weight percent di-n-propyl peroxydicarbonate and from about 5 to 75 weight percent of miscible diluent, said diluent containing at least 50 weight percent of lower alkyl substituted cyclohexane.

2. A composition according to claim 1 wherein the weight percent of di-n-propyl peroxydicarbonate is from 50 to 85 percent.

3. A composition according to claim 1 wherein the lower alkyl substituted cyclohexane is methylcyclohexane.

4. A composition according to claim 1 wherein the lower alkyl substituted cyclohexane is selected from the group consisting of methylcyclohexane, dimethylcyclohexane, trimethylcyclohexane, isopropylcyclohexane, 4-isopropyl-1-methylcyclohexane and mixtures of such compounds.

5. A composition according to claim 4 wherein the weight percent of di-n-propyl peroxydicarbonate is from about 50 to about 85 percent.

6. A composition according to claim 4 wherein said diluent contains from 60 to 90 weight percent or lower alkyl substituted cyclohexane.

7. A composition according to claim 1 wherein said diluent contains from 60 to 90 weight percent of lower alkyl substituted cyclohexane.

8. A composition according to claim 7 wherein the lower alkyl substituted cyclohexane is methylcyclohexane.

9. A composition according to claim 2 wherein said diluent contains from 60 to 90 weight percent of lower alkyl substituted cyclohexane selected from the group consisting of methylcyclohexane, dimethylcyclohexane, trimethylcyclohexane, isopropylcyclohexane, 4-isopropyl-1-methylcyclohexane and mixtures of such compounds.

10. A composition according to claim 2 wherein said diluent contains from 60 to 90 weight percent of lower alkyl substituted cyclohexane.

11. A composition consisting essentially of about 85 weight percent di-n-propyl peroxydicarbonate and about 15 weight percent of miscible diluent, said diluent containing at least 50 weight percent of lower alkyl substituted cyclohexane.

12. The composition of claim 11 wherein said lower alkyl substituted cyclohexane is methylcyclohexane.

References Cited

UNITED STATES PATENTS

| 2,370,588 | 2/1945 | Strain | 252—426 X |
| 2,517,964 | 8/1950 | Bissinger | 252—426 X |

FOREIGN PATENTS

| 1,138,643 | 1/1969 | Great Britain | 260—463 |

OTHER REFERENCES

Mellan, Industrial Solvents, 2nd edition (1950), Reinhold Pub. Corp., New York, N.Y., pp. 286–287.

Scheflan et al., The Handbook of Solvents (1953), pub. by D. Van Nostrand Co., Inc., New York, N.Y., pp. 309, 475, 514, 515.

PATRICK P. GARVIN, Primary Examiner

U.S. Cl. X.R.

260—463, 94.9 CD, 92.8